Nov. 11, 1969     L. PENSAK     3,478,260
TESTING FOR THE PRESENCE OF A CONTAMINANT IN AN INSULATING OR SEMICONDUCTING MEDIUM
Filed Aug. 19, 1966
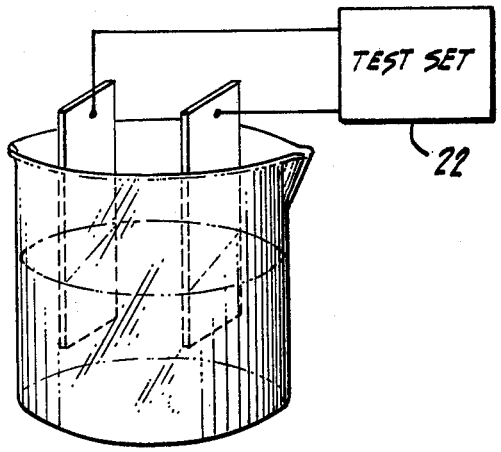
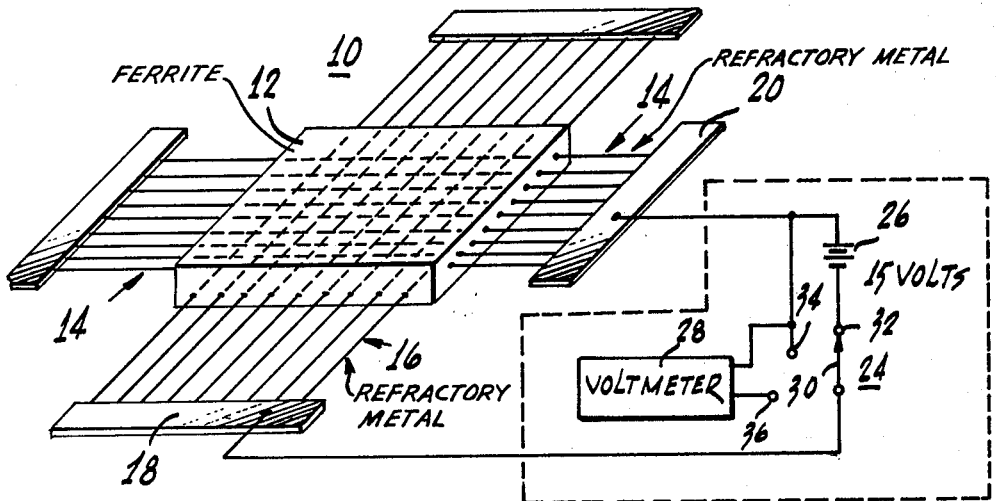
INVENTOR
LOUIS PENSAK
BY
ATTORNEY

United States Patent Office 3,478,260
Patented Nov. 11, 1969

3,478,260
TESTING FOR THE PRESENCE OF A CONTAMINANT IN AN INSULATING OR SEMICONDUCTING MEDIUM
Louis Pensak, Princeton, N.J., assignor to RCA Corporation, a corporation of Delaware
Filed Aug. 19, 1966, Ser. No. 573,711
Int. Cl. G01r 11/44
U.S. Cl. 324—30                    2 Claims

ABSTRACT OF THE DISCLOSURE

The substance being tested is located between spaced conductors and a voltage is applied across the conductors. The conductors are then shorted for a fixed interval and then the initial amplitude of any residual voltage which remains between the two conductors is measured. This instantaneous amplitude is found to be indicative of the amount of contaminant such as water present in the substance.

---

This invention relates to non-destructive testing and particularly to a method for the detection of a contaminant in a poorly conducting or insulating medium.

According to the invention, a voltage is applied across two spaced conductors between which the medium being tested is located. After a short time interval, the voltage is removed and the two conductors briefly shorted. Then the short is removed and the spaced conductors tested for voltage. The presence of a voltage is indicative of the presence of a contaminant and the initial amplitude of the voltage is indicative of the amount of the contaminant.

While the precise mechanism which makes the invention work is not completely understood, it is believed that when a voltage is initially applied to the two conductors, the ions present in the contaminant migrate to the respective conductors in a manner analogous to the conduction of cations and anions from the electrolyte to the negative and positive electrodes, respectively, of a storage cell. It is also believed that during the application of the voltage, a charge is stored due to the capacitance exhibited by the medium and conductors and the shorting of the conductors discharges this charge. After the short is removed, the medium and its conductors are believed to act like a storage cell. The output voltage produced by this cell decays relatively rapidly through the medium because of the semiconducting nature of the medium, however, the decay time is of sufficient duration that the voltage readily may be measured. The initial amplitude of the voltage—a measure of the degree of contamination, is relatively high—one volt in an example discussed below.

The invention is discussed in greater detail below and is illustrated in the following drawings of which:

FIGURE 1 is a flow chart of the method of the invention;

FIGURE 2 is a schematic diagram of a ferrite memory plane and apparatus for testing it according to the invention; and FIGURE 3 is a schematic diagram showing how the purity of water may be tested according to the invention.

The memory 10 of FIGURE 3 comprises a ferrite block 12, colloquially known as a memory "plane," with a set of $x$ conductors 14 and a set of $y$ conductors 16 both of which pass through the plane. The $x$ conductors are spaced from one another and from the $y$ conductors and the locations in the block where the $x$ and $y$ wires cross define memory locations. For purposes of illustration, nine $x$ wires and nine $y$ wires are shown and these define 81 memory locations.

The method of constructing the memory of FIGURE 2 and the method of operating the memory are well known. The conductors passing through the block are normally made of a refractory metal held together by a binder. Metal such as platinum, rhodium, rhenium, gold or the like are normally employed. The fabrication of the memory entails laminating together "green" sheets of ferrite, some of which are formed with conductors on or in one surface thereof, and firing the structure at high temperatures. Thereafter, the leads external of the block are secured to the refractory metal conductors by soldering or the like.

As received from the factory, the ends of the leads are shorted together by metal plates such as 18 and 20, respectively. Their purpose is to maintain the leads spaced fixed intervals apart during the manufacturing process. These plates are severed from the ends of the conductors, in due course, and the conductors soldered to individual tabs to which the memory drive currents are applied.

The ferrite of the memory of FIGURE 2 is somewhat porous and it has the tendency to accumulate moisture from the atmosphere. It is found that when moisture is present in the memory, the ferrite decomposes in due course, during the operation of the memory, and this causes failure of the memory by burnouts or the like. Accordingly, after the memory is fabricated it is normally placed in a hermetic package to avoid moisture contamination. It is important to be able to measure the moisture content in the memory both prior to packaging and after packaging to be certain that first, the memory is satisfactory initially and second, that moisture leakage into the package does not occur.

The apparatus shown within the dashed block 22 is employed to do the testing in accordance with the method of the present invention. The apparatus includes a switch 24, a battery 26 and a high impedance voltmeter 28.

The switch arm 30 first is placed in contact with terminal 32. The battery 26 thereupon applies a voltage of perhaps 15 volts to the plates 18 and 20 connected to the sets of wires 16 and 14, respectively. The voltage can be applied for a relatively short time such as 3 to 5 seconds. During this time, the ions present in the moisture trapped in the ferrite deposit on the positively and negatively charged sets of wires, respectively. While the precise nature of what is occurring within the block is not fully understood, at this time, it is believed that positive ions, such as iron ions, deposit on the set of wires connected to the negative battery terminal and negative ions, such as oxygen ions, deposite on the set of wires connected to the positive terminal. As the ferrite composition is relatively complex and includes, in addition to iron, principal components such as manganese and traces of many other elements, the migration of other ions is probably also occurring at the same time.

The accumulation of positive and negative ions on the respective sets of wires during the time the voltage source 26 is in the circuit, causes the two initially identical sets of drive wires to exhibit chemically different properties. These wires are believed to act like the electrodes of a battery and the moisture to act like the electrolyte of the battery. The battery effect persists as long as the separated ions remain unneutralized, and the magnitude of the effect is proportional to the number of such ions present at any instant of time.

After the charging step discussed above, arm 30 is connected to terminal 34 for a short time such as a second or so. During this period, the charge stored between the sets of wires 14 and 16, respectively, due to the capacitance between these sets of conductors, is discharged.

If the internal resistance between the electrodes is sufficiently low, the capacitatively stored charge will be discharged by waiting a suitable period of time even without shorting the wires (without connecting arm 30 to terminal 34). However, the shorting of the wires insures that the full "capacitor" discharge occurs "immediately." The battery is not fully discharged in the same period, probably because the ions are not all in direct contact with their respective electrodes and reach it only by slow diffusion.

While the shorting interval is not critical in the range of 0.1 to 2 seconds, its value should be precisely fixed in order to be able to compare the voltage obtained with the voltages subsequently obtained from the same or different units to be tested. Moreover, the longer the shorting interval, the lower the initial amplitude of the voltage produced across the electrodes, the shorting interval should not exceed some given period such as two seconds.

The switch arm 30 next is moved to terminal 36 to connect the high impedance voltmeter 28 across the two sets of wires. (If desired, the two input terminals to the meter may be shorted together immediately before this is done, to insure a zero reading, and the short then removed.) The memory now acts like a storage battery and produces the output voltage which the voltmeter 28 measures. This output voltage decays exponentially with time and the decay period may be ten or more seconds.

In practicing the invention above, it has been found that the voltage measured by the voltmeter 28 is a true measure of the moisture content of the memory block 12. With the values of the parameters as indicated, a memory plane which is saturated with moisture produces a maximum output voltage as high as one volt. (The memory plane may be saturated with moisture by placing it in an atmosphere having a relative humidity of 95% or so for several hours.)

Memory planes have also been tested which have been dried by a combination of heat and vacuum to the degree that they produced zero output voltage. Such planes have been found to develop 10 millivolts of signal, within 30 seconds, upon exposure to air.

The method of the present invention, while illustrated in terms of measuring the moisture content of a ferrite memory, is applicable to the testing of many other materials. Some material properties which should be present for this type of testing are first, that the contaminant be one containing mobile ions and second, that the medium, in the absence of the contaminant, conducts relatively poorly or not at all. Broadly speaking, the material should be a semiconductor or an insulator.

A typical example, other than the one given, of where the method of the invention may be used is to test the substrate of an integrated circuit for moisture content. Another is to test a bulk device such as a transistor for moisture contamination between the base and the collector, or base and emitter. An important advantage of this method lies in its application to those problems where the measurement of an ionic contaminant is not possible by direct current measurement because such currents are masked by current flow due to other mechanisms.

FIGURE 3 illustrates still another use for the present invention, that of testing ultra pure water for contamination. Pure water is a relatively good insulator. However, any impurities in the water readily can be ionized and accordingly the method of testing the present invention is applicable. It is only necessary to connect the tester at 22 to two plates, preferably made of an inert material such as gold, platinum or others in this family or even a material such as carbon, and to place these plates in the water. The testing procedure is exactly the same as described in connection with FIGURE 2.

What is claimed is:

1. A method for testing a memory of the type comprising a block of ferrite having a group of $x$ conductors and a group of $y$ conductors embedded therein, for the presence of water, comprising the steps of:
   applying a voltage difference between the group of $x$ conductors on the one hand and the group of $y$ conductors on the other hand;
   directly connecting the $x$ conductors to the $y$ conductors for a fixed time interval to discharge the charge due to the capacitance between the conductors; and
   sensing for the presence and amount of water in the ferrite comprising the step of removing the direct connection between the group of $x$ conductors and the group of $y$ conductors and then measuring the amplitude of the voltage between the group of $x$ conductors and the group of $y$ conductors, said amplitude indicating the amount of water.

2. A method for testing a memory as set forth in claim 1 wherein said $x$ and $y$ conductors are formed of a refractory metal.

References Cited

UNITED STATES PATENTS

| 1,882,581 | 10/1932 | Haskins | 324—29.5 |
| 2,632,793 | 3/1953 | Linn | 324—29.5 |
| 1,922,792 | 8/1933 | Cain | 324—29.5 |
| 2,786,021 | 3/1957 | Marsh | 324—29 X |
| 2,796,583 | 6/1957 | Marsh et al. | 324—30 |
| 3,096,185 | 7/1963 | Lucero | 317—258 X |

FOREIGN PATENTS 1,018,877   2/1966   Great Britain.

OTHER REFERENCES

Green, Kurt: "Measuring Dielectric Absorption," Electronics, Mar. 18, 1960 pp. 90 and 92.

Perkins, Henry A.: College Physics, Revised Edition (1946) Prentice-Hall, Inc., N.Y. p. 554, section 599.

RUDOLPH V. ROLINEC, Primary Examiner

C. F. ROBERTS, Assistant Examiner

U.S. Cl. X.R.

204—1; 317—246, 258; 324—29, 54